United States Patent
Aurand et al.

(10) Patent No.: US 12,449,464 B2
(45) Date of Patent: Oct. 21, 2025

(54) METHOD FOR DETERMINING AT LEAST ONE CURRENT CAPACITANCE VALUE OF A Y CAPACITANCE OF A HIGH-VOLTAGE WIRING SYSTEM, AS WELL AS AN ELECTRONIC COMPUTING DEVICE

(71) Applicant: Mercedes-Benz Group AG, Stuttgart (DE)

(72) Inventors: Tobias Aurand, Ludwigsburg (DE); Markus Zimmer, Leinfelden-Echterdingen (DE)

(73) Assignee: Mercedes-Benz Group AG, Stuttgart (DE)

( * ) Notice: Subject to any disclaimer, the term of this patent is extended or adjusted under 35 U.S.C. 154(b) by 237 days.

(21) Appl. No.: 18/254,825

(22) PCT Filed: Nov. 2, 2021

(86) PCT No.: PCT/EP2021/080402
§ 371 (c)(1),
(2) Date: May 26, 2023

(87) PCT Pub. No.: WO2022/111952
PCT Pub. Date: Jun. 2, 2022

(65) Prior Publication Data
US 2024/0027509 A1    Jan. 25, 2024

(30) Foreign Application Priority Data
Nov. 27, 2020   (DE) ................. 10 2020 007 243.7

(51) Int. Cl.
*G01R 31/00*    (2006.01)
*G01R 27/02*    (2006.01)
*B60R 16/02*    (2006.01)

(52) U.S. Cl.
CPC ......... *G01R 31/007* (2013.01); *G01R 27/025* (2013.01); *B60R 16/0207* (2013.01)

(58) Field of Classification Search
CPC .......... G01R 31/005–007; G01R 31/12; G01R 31/52; G01R 27/2605; G01R 27/025
See application file for complete search history.

(56) References Cited

U.S. PATENT DOCUMENTS 9,696,384  B2   7/2017  Wang et al.
10,101,378 B2   10/2018 Jung et al.
(Continued)

FOREIGN PATENT DOCUMENTS

DE   10 2010 054 413 A1   8/2011
DE   10 2013 216 801 A1   3/2014
(Continued)

OTHER PUBLICATIONS

PCT/EP2021/080402, International Search Report dated Feb. 4, 2022 (Three (3) pages).
(Continued)

*Primary Examiner* — Lee E Rodak
*Assistant Examiner* — Demetrius R Pretlow
(74) *Attorney, Agent, or Firm* — Crowell & Moring LLP

(57) ABSTRACT

A method for determining a current capacitance value of a Y capacitance of an electrical wiring system for an electrically operated motor vehicle by an electronic computing device where a high-voltage energy store of the electrical wiring system is electrically coupled with an energy store-external part by a switching device. In an energy store-internal part of the electrical wiring system, determining a first insulation resistance on a basis of a capacitance value of the electrical wiring system by a first insulation monitor. Determining a second insulation resistance of the electrical wiring system by a second insulation monitor of the energy (Continued)

store-external part. Comparing the first insulation resistance with the second insulation resistance by the electronic computing device. On a basis of the comparing, adjusting the capacitance value for determining the first insulation resistance by the first insulation monitor such that the first insulation resistance matches the second insulation resistance.

9 Claims, 1 Drawing Sheet

(56) References Cited

U.S. PATENT DOCUMENTS

| | | | |
|---|---|---|---|
| 10,605,845 B2 | 3/2020 | Mensler et al. | |
| 10,908,199 B2 | 2/2021 | Sung et al. | |
| 10,928,429 B2* | 2/2021 | Yan | G01R 31/006 |
| 2009/0134881 A1* | 5/2009 | Tachizaki | B60L 3/0023 |
| | | | 324/551 |
| 2017/0016951 A1 | 1/2017 | Sung et al. | |
| 2020/0127469 A1 | 4/2020 | Haindl et al. | |

FOREIGN PATENT DOCUMENTS

| | | |
|---|---|---|
| DE | 10 2016 006 642 A1 | 2/2017 |
| DE | 10 2016 214 458 A1 | 6/2017 |
| DE | 10 2016 005 732 A1 | 11/2017 |
| DE | 10 2018 002 926 A1 | 9/2018 |
| DE | 10 2020 003 878 A1 | 8/2020 |
| DE | 10 2019 202 892 A1 | 9/2020 |
| JP | 2006-343267 A | 12/2006 |
| JP | 2012-37426 A | 2/2012 |
| JP | 2014-126382 A | 7/2014 |
| JP | 2017-501396 A | 1/2017 |
| JP | 2017-530333 A | 10/2017 |
| JP | 2019-521361 A | 7/2019 |

OTHER PUBLICATIONS

German-language German Office Action issued in German application No. 10 2020 007 243.7 dated Sep. 15, 2021 (Eight (8) pages).
Japanese-language Japanese Office Action issued in Japanese Application No. 2023-531523 dated Jun. 6, 2024 (4 pages).

* cited by examiner

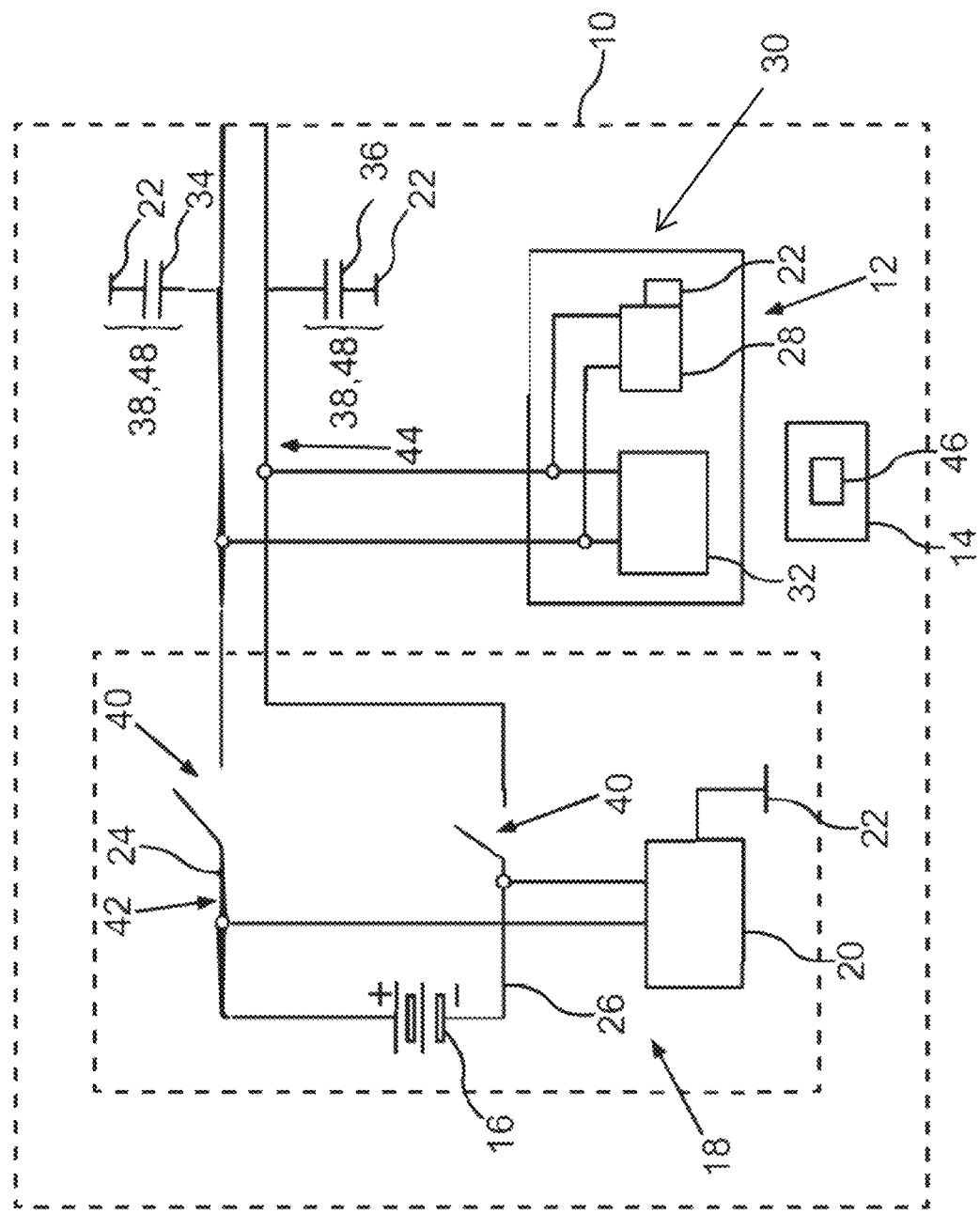

METHOD FOR DETERMINING AT LEAST ONE CURRENT CAPACITANCE VALUE OF A Y CAPACITANCE OF A HIGH-VOLTAGE WIRING SYSTEM, AS WELL AS AN ELECTRONIC COMPUTING DEVICE

BACKGROUND AND SUMMARY OF THE INVENTION

The invention relates to a method for determining at least one current capacitance value of a Y capacitance of a high-voltage wiring system for an at least partially electrically operated motor vehicle by means of an electronic computing device. Further, the invention relates to an electrical wiring system.

It is already known from the prior art that the threshold value of all capacitances in an electrical wiring system of an at least partially electrically operated motor vehicle between the electrical potentials HV+ and HV− as well as a respective vehicle mass in an HV vehicle system, referred to in technical language use as Y capacitance (Cy), represents an approval-relevant size that must be produced when manufacturing or when determining the system. This value is limited since this capacitance discharges when a HV potential and the vehicle are simultaneously touching the body and could therefore possibly lead to a dangerous electric shock. Since these capacitances, on the one hand, arise through parasitic effects and, on the other hand, are integrated into components in the form of component parts for interference suppression in their electronic circuits and also have an influence on the insulation coordinates, it is important to know the actual value of this Y capacitance as well as possible.

DE 10 2016 006 642 A1 relates to a high-voltage battery for a motor vehicle comprising an electrically conductive battery housing, a battery cell stack, which is formed from a plurality of battery cells electrically connected in series and arranged inside the battery housing to provide a high voltage, wherein the battery cell stack is placed between a high-voltage positive line, which is electrically conductively connected with the positive pole of the battery cell stack, and a high-voltage negative line, which is electrically conductively connected with the negative pole of the battery cell stack, and an insulation measuring device, which is designed to identify an insulation fault on the basis of an insulation resistance between the battery cell stack and the battery housing. A localization device is designed to locate the identified insulation fault in the battery cell stack on the basis of a first voltage applied between the high-voltage positive line and the battery housing and/or of a second voltage applied between the high-voltage negative line and the battery housing. The invention additionally relates to a corresponding method.

According to DE 10 2010 054 413 A1, a method is provided for locating an insulation fault in a system that has a DC section with a High Side (HV+) and a Low Side (HV−) and an AC section including an inverter with at least one series circuit made up of two circuit breakers, which is switched between the High Side (HS) and the Low Side (LS). The DC section is supplied with a DC voltage from a DC voltage source. A through-switching of the circuit breaker lying directly on the HS side occurs corresponding to an HS through-connection state, a through-switching of the circuit breaker lying directly on the LS side occurs corresponding to an LS through-connection state, an HS insulation voltage between the HS side and a ground as well as an LS insulation voltage between the LS side and the ground are respectively measured in both of the two through-connection states, and finally it is identified, based on the measurement results, whether an insulation fault is present in the DC section or AC section.

A device and a method for recording a dielectric breakdown in an environmentally-friendly vehicle is provided in DE 10 2016 214 458 A1. The device contains a measuring device, which is configured for measuring resistance values of insulation resistors, which are arranged across a high-voltage battery, and a controller, which is configured for measuring a voltage applied to the insulation resistor using the measuring device and analysing a pattern of the measured voltage, in order to record a section of the dielectric breakdown.

DE 10 2018 002 926 A1 relates to an electrical wiring system for a motor vehicle, having at least one first and one second electrical potential line, wherein the wiring system is formed to be acted upon with an electrical DC voltage between the potential lines in an intended operation, wherein the wiring system has at least one Y capacitor, which is electrically coupled with a first connection with one of the potential lines and with a second connection with an electrical reference potential, wherein a switching element is connected in series with at least one Y capacitor.

DE 10 2020 003 878 A1 also shows a high-voltage wiring system for an at least partially electrically operated motor vehicle with at least one high-voltage energy store and with an energy store-external part. The high-voltage energy store has a safety device, which is formed for the electrical connection of the high-voltage energy store with the energy store-external part, and a first insulation monitor. The high-voltage wiring system additionally has a central second insulation monitor, at least for the energy store-external part.

A system and a method for the simultaneous calculation of an insulation resistance value and a Y capacitance of an energy store system is known from DE 10 2013 216 801 A1. A first signal is hereby injected into the energy store system, wherein an output signal from the energy store system is then recorded as a response to the first signal. From the first signal and the output signal, a value is then, in a method, determined as the Y capacitance and a value is determined as the insulation resistance.

It is the object of the present invention to provide a method as well as an electrical wiring system by means of which a more precise determining of a Y capacitance can be realized inside an electrical wiring system.

One aspect of the invention relates to a method for determining at least one current capacitance value of a Y capacitance of a high-voltage wiring system for an at least partially electrically operated motor vehicle by means of an electronic computing device, wherein a high-voltage energy store of the high-voltage wiring system is electrically coupled with an energy store-external part by means of a switching device of the high-voltage wiring system and wherein, in an energy store-internal part of the high-voltage wiring system, a first insulation resistance is determined on the basis of a capacitance value of the electrical wiring system by means of a first insulation monitor.

It is provided that a second insulation resistance of the electrical wiring system, in particular of the high-voltage wiring system, is determined by means of at least one central second insulation monitor, and the first insulation resistance is compared with the second insulation resistance by means of the electronic computing device of the electrical wiring system and, on the basis of the comparison, the capacitance value is adjusted for determining the first insulation resistance of the electrical wiring system by means of the first insulation monitor, such that the first insulation resistance matches the second insulation resistance.

It is thereby enabled that the first insulation resistance can be determined by means of the first insulation monitor, even if a current capacitance value of the whole wiring system is not known and so that the first insulation monitor of the energy store-internal part of the high-voltage wiring system can also be used for an exact determining of the insulation resistance in the whole wiring system.

It should be noted here that the second insulation monitor does not need any knowledge of a current capacitance value of the wiring system for determining the insulation resistance in the whole wiring system, and can carry out the determining independently of this. In contrast, the first insulation monitor of the energy store-internal part of the high-voltage wiring system is actually designed to determine the insulation resistance of the energy store-internal part of the high-voltage wiring system and, for this, needs the current capacitance value of the wiring system to be measured, which is known for the energy store-internal part of the high-voltage wiring system and is stored in the computing device. The first insulation monitor of the energy store-internal part of the high-voltage wiring system can thus easily determine the insulation resistance of the energy store-internal part of the high-voltage wiring system, on the basis of the capacitance value, but actually needs the capacitance value of the whole wiring system, which is usually not known, for determining the insulation resistance in the whole wiring system.

The method now uses the comparison between the first insulation resistance and the second insulation resistance, by means of the electronic computing device of the electrical wiring system, in that the capacitance value on which the first insulation resistance depends, is varied and is adjusted until the first insulation resistance has matched with the second insulation resistance. Since the insulation resistances of the first and second insulation monitors are now the same, in particular identical, it can be assumed from this that the capacitance value, which had been used for determining the first insulation resistance, now corresponds to the current capacitance value of the wiring system. By means of the comparison of the insulation resistances of the first and second insulation monitor, an inference and determining of the current capacitance value of the wiring system can thus directly occur. This current capacitance value can then be saved and stored in the computing device or other data storage devices, in particular also as the starting capacitance value for determining the insulation resistance for the whole wiring system. Other functions which depend on the capacitances, in particular on the Y capacitances, can thus draw on the currently determined capacitance values and use these.

In other words, the Y capacitance, which can also be referred to as the Cy value, can be approximately or very exactly determined in the high-voltage system in the motor vehicle by means of the method. The total of the Y capacitances is approval-relevant, and the conformity of the whole system can be checked, in particular when using vehicle bodies connected to the high-voltage system. Furthermore, the simple insulation measuring devices provide precise values if the corresponding Y capacitances are known. It there is a failure of, for example, the second insulation monitor in the high-voltage system, the battery-internal insulation measuring device, in other words the first insulation monitor, can therefore alternatively enable the further operation of the high-voltage system. A complete failure of the motor vehicle thus does not occur. The insulation values identified by the substitute device are significantly more precise due to the identified and saved Cy values, whereby there is an increased security against false warnings concerning an encountered insulation fault and the corresponding statutory trigger thresholds are also met in the case of a fault.

If the identified capacitance value or the identified insulation resistance of the first insulation monitor differs from the second insulation monitor, then the calculation can be repeated recursively and with changed Cy values saved in the internal insulation monitor until both results match with the measurement.

Further, an improved recognition of unbalanced loads can be realized. For a secure recognition of unbalanced loads and a corresponding handling of such an unbalanced load, the necessary Cy values can correspondingly be recognized at any time and can furthermore be dynamically adjusted to ageing and temperature processes. Since it is possible to determine the Cy values, it is not necessary to specify or store corresponding parameters for every vehicle configuration. A reconfiguration of the motor vehicle and thus accompanying changes in the high-voltage system are also directly compensated for.

The availability is thus increased in the case of a fault, which saves a user of the motor vehicle time and costs, since they can at least drive the motor vehicle to the next workshop and do not have to wait for the motor vehicle to be towed.

It is in particular provided that the first insulation monitor is located inside the high-voltage energy store, which is in the position to determine the insulation resistance of the high-voltage energy store before switching on. Meanwhile, the second insulation monitor measures the insulation resistance of the remaining high-voltage wiring system in another component, in order to avoid the electrical energy store or, for example, also a fuel cell being connected to the high-voltage wiring system, which has potential insulation problems. If there is a failure of the external central second insulation monitor, then the insulation value of the remaining high-voltage wiring system is not known, and it should be assumed that there is an error due to the approval relevance of this value, and the operation of the vehicle is possibly prevented, which would cause stalling. It is now additionally provided that, with a failure of the second insulation monitor, the first insulation monitor, which is in particular reduced in function in its embodiment compared to the second insulation monitor, takes over determining the insulation value. To this end, the first insulation monitor, however, needs the capacitance value of the region of the wiring system, for which it should determine the insulation resistance. Since while there was a still-functional second insulation monitor, determining the capacitance value was however enabled via the comparison of the first to second insulation resistance and was stored for current use, the first insulation monitor with the stored capacitance value can now thus take over determining the stored capacitance value for the wiring system, in particular for the whole wiring system. An emergency operation of the motor vehicle can thus be enabled when there is a failure of the second insulation monitor. By means of determining the Y capacitance value, the likelihood of a fault can be reduced still further.

Since, depending on the connection of parts of the wiring system, different configurations are also possible, which can all have different capacitance values, several capacitance values can also be determined and stored, so that for every possible configuration of the wiring system, depending on the connection of sub-regions of the wiring system, a custom capacitance value is also stored and in an operating state of the respective configuration is also accessed again and can be used for determining the first insulation resistance by means of the first insulation monitor.

In particular, the invention therefore uses the fact that the first insulation monitor can function better, the more precisely the Y capacitance at the respective high-voltage potentials is known. Should there be a failure of the second insulation monitor, then a reliable further operation can be realized with the first insulation monitor, by means of the prior determining of the Y capacitance.

According to an advantageous embodiment, a starting capacitance value is predetermined as a saved capacitance value in a storage device of the electronic computing device for the capacitance value. For example, the starting capacitance value can be determined during the production of the electrical wiring system and can be stored in the storage device. By means of corresponding ageing within the electrical wiring system, there can be a deviation from the starting capacitance value. By means of this deviation, there can in turn be a different determining of an insulation resistance. According to the invention, it is now provided that the starting capacitance value is replaced or supplemented by means of the current capacitance value. It can be advantageous leaving the original starting capacitance value in the memory, in order to carry out a comparison of the current capacitance value with this. The currently determined capacitance value can also, as already described, be to another configuration of the wiring system and thus another capacitance value. Advantageously, a history of the determined and stored capacitance values can also be compiled, using which, among other things, changes and ageing of the wiring system or of regions of the wiring system can be understood and possibly also predicted.

It is furthermore advantageous if the starting capacitance value is predetermined when the motor vehicle is being manufactured. In particular, corresponding measurements can be carried out on the motor vehicle and the corresponding starting capacitance values, which also correspond to Y capacitance values, are taken into account. These can, for example, then be stored in the storage device and can be provided for future use for the electronic computing device.

Further, it has been shown to be advantageous if the first insulation resistance is periodically compared with the second insulation resistance and an adjustment of the current capacitance value is carried out. In particular, corresponding measurement results of the first insulation monitor and of the second insulation monitor are periodically compared with each other, wherein this is in particular carried out during the operation of the high-voltage wiring system. There is therefore in particular switching between the first insulation monitor and the second insulation monitor. If the values are sufficiently stable across several measurements, then the value of the first insulation monitor can be compared with the value of the second insulation monitor. If both insulation resistances almost match, in particular exactly match, then the capacitance value substantially corresponds to the current capacitance value and the capacitance value is adopted as the current capacitance value, wherein this in particular approximately corresponds to the actual value of the sum of the corresponding Y capacitances.

It is furthermore advantageous if the first capacitance value is iteratively adjusted for determining the current capacitance value. In other words, the method corresponds, in the figurative sense, to a comparison of an analogue measuring bridge, wherein unknown values are also identified by means of comparison with known values. The capacitance value is iteratively adjusted until the value of the first insulation resistance corresponds to the measured value of the second insulation resistance, which was determined by means of the second insulation monitor, without knowledge of a capacitance. A simple and therefore reliable method can thus be provided.

In a further advantageous embodiment, the current capacitance value is saved for a future analysis of a storage device of the electronic computing device. In other words, the current capacitance values identified in the method are saved. For future measurements, the currently stored capacitance value can therefore be taken into consideration. It can then, for example, be provided that the currently identified capacitance value is used for future verification, whereby the comparison and matching between the insulation resistances of the first and second insulation monitor is then, in turn, carried out.

It is also advantageous if, depending on the determined current capacitance value, the current insulation resistance of the electrical wiring system is determined by means of the first insulation monitor. For example, an ageing of insulations can be determined inside the motor vehicle. Corresponding warnings can then be output for a user of the motor vehicle that a certain component of the motor vehicle or its insulation is defective, so that this can, for example, search out a workshop early, without, for example, causing stalling.

According to a further advantageous embodiment, a new determining of the current capacitance value is carried out after an adjustment of the current capacitance value and is compared with the adjusted current capacitance value. A verification of the identified Y capacitance value can thereby be carried out for the first insulation monitor. It can therefore be verified whether the currently identified capacitance value also corresponds to the actual capacitance value.

It can additionally be provided, since in general more than one electrical energy store is built into the motor vehicle, that with this method according to the invention, the remaining first insulation monitor of the respective energy store can also identify the Cy values and that then, for example, the electronic computing device can form an average of all identified results. This average can then, in turn, be stored and be used as the current capacitance value. Alternatively, the capacitances determined using the first insulation monitor by means of the method can also first be compared, so that anomalies of the values or erroneous values remain disregarded in the averaging process. Alternatively, if there is a plurality of values, a median of the values can, however, also be stored as the current capacitance value.

A further aspect of the invention relates to an electrical wiring system for an at least partially electrically operated motor vehicle, having at least one electronic computing device, having an electrical high-voltage energy store, having a first insulation monitor and having a second insulation monitor, wherein the electrical wiring system is configured for carrying out a method according to the preceding aspect. The method is in particular carried out by means of the electrical wiring system.

Yet another further aspect of the invention relates to a motor vehicle having an electrical wiring system according to the preceding aspect. The motor vehicle is in particular at least partially electrically operated. In particular, the motor vehicle is completely electrically operated.

Advantageous embodiments of the method are to be seen as advantageous embodiments of the electrical wiring system as well as of the motor vehicle. To this end, the electrical wiring system as well as the motor vehicle have representational features which enable the method to be carried out.

Further advantages, features and details of the invention arise from the description of a preferred exemplary embodiment below, as well as with the aid of the drawing. The features and feature combinations cited in the description above and below in the description of the FIGURE and/or shown in the single FIGURE alone can be used not only in each specified combination, but rather also in other combinations or individually, without leaving the scope of the invention.

BRIEF DESCRIPTION OF THE DRAWING

The single FIGURE thereby shows a schematic block diagram of an embodiment of a motor vehicle with an embodiment of an electrical wiring system.

DETAILED DESCRIPTION OF THE DRAWING

In the FIGURE, the same or functionally identical elements are provided with the same reference numerals.

The FIGURE purely schematically shows an embodiment of a motor vehicle 10 having an embodiment of an electrical wiring system 12. The electrical wiring system 12 is formed for the at least partially electrically operated motor vehicle 10, in particular for the completely electrically operated motor vehicle 10. The electrical wiring system 12 is in particular a so-called high-voltage wiring system. The electrical wiring system 12 has at least one electronic computing device 14. Further, the electrical wiring system 12 has at least one high-voltage energy store 16. It can be provided that the electrical wiring system 12 also has a plurality of further high-voltage energy stores 16. The electrical wiring system 12 further has a first insulation monitor 20 in an energy store-internal part 18, which is coupled with a ground 22 of the motor vehicle 10. The first insulation monitor 20 is coupled with the high-voltage potentials 24, 26 of the high-voltage energy store 16. In particular, the first insulation monitor is coupled with a high-voltage positive potential 24 and a high-voltage negative potential 26.

The electrical wiring system 12 further has a second insulation monitor 28, which can also be referred to as the central insulation monitor. The second insulation monitor 28 is formed in an energy store-external part 30 of the electrical wiring system 12. It can further be provided that the electrical wiring system 12 has a pre-charging circuit 32 for pre-charging the energy store-external part 30.

The first insulation monitor 20 is in particular formed with reduced function compared to the second insulation monitor 28.

A first Y capacitance 34 can be formed in the high-voltage positive path 24 and a second Y capacitance 36 can be formed in the high-voltage negative path 26. The first Y capacitance 34 is thus a Y capacitance which is formed between the high-voltage positive path 24 and the ground 22, and the second Y capacitance 36 is a Y capacitance which is formed between the high-voltage negative path 26 and the ground 22.

In the method for determining the at least one current capacitance value 38 of a Y capacitance 34, 36 of the high-voltage wiring system 12, the at least partially electrically operated motor vehicle 10 is electrically coupled with the energy store-external part 30 by means of the electronic computing device 14, the high-voltage energy store 16 of the high-voltage wiring system 12 is electrically coupled with the energy store-external part 30 by means of a switching device 40 of the high-voltage wiring system 12, and a first insulation resistance 42 is determined on the basis of a capacitance value 48 of the electrical wiring system 12 by means of the first insulation monitor 20 in the energy store-internal part 18 of the electrical wiring system 12.

It is provided that, by means of at least the second insulation monitor 28 of the energy store-external part 30, a second insulation resistance 44 of the electrical wiring system 12 is determined, and the first insulation resistance 42 is compared with the second insulation resistance 44 by means of the electronic computing device 14 of the electrical wiring system 12 and, on the basis of the comparison, the capacitance value 48 for determining the first insulation resistance 42 of the electrical wiring system 12 is adjusted by means of the first insulation monitor 20 such that the first insulation resistance 42 matches the second insulation resistance 44.

In particular, to this end it can be provided that a starting capacitance value for determining the first insulation resistance 42 is predetermined as a saved capacitance value in a storage device 46 of the electronic computing device 14. By means of the comparison of the first insulation resistance 42 to the second insulation resistance 44, the capacitance value 48 can be determined and can be adopted as the current capacitance value 38 for the Y capacitance 34, 36. The starting capacitance value can in particular be predetermined when the motor vehicle is being manufactured.

It is therefore in particular recommended that the energy store-internal first insulation monitor 20 can be used for determining the first insulation resistance 42, for which the Y capacitances 34, 36 must be sufficiently known, i.e., only if the stored Cy value of the Y capacitances 34, 36, in particular a total of the Y capacitances 34, 36, is known, does the measured value of the first insulation resistance 42 also match. It is now proposed that the results of the second insulation monitor 28 are used as a reference, and, during the operation of the electrical wiring system 12, periodic switching between the central and battery-internal insulation monitor 20, 28 occurs. If the values are sufficiently stable across several measurements, then the value of the first insulation monitor 20 can be compared with the value of the second insulation monitor 28. If both match, then the value of the capacitance 48 stored in the first insulation monitor 20 for correction purposes almost corresponds to the actual value of the total Y capacitances 34, 36.

If the identified value of the first insulation resistance 42 differs from the value of the second insulation resistance 44, which has been identified by means of the second insulation monitor 28, then the determining can be recursively repeated with changed capacitances 48, in particular the Cy values, until both results of the insulation resistance measuring match. A renewed measuring can then be carried out for confirmation. The method corresponds, in a figurative sense, to the comparison of an analogue measuring bridge, wherein unknown values are also identified by means of comparison with known values. The value of the capacitance 48 for the first insulation monitor 20 is adjusted until the value of the first insulation resistance 42 measured by the latter corresponds to the value of the second insulation resistance 44, wherein the second insulation resistance 44 is determined by means of the second insulation monitor 28, in particular independently of the Cy values.

Since in general more than one high-voltage energy store 16 is installed in the motor vehicle 10, with this method, the Cy values can also be identified via the remaining insulation monitors of the high-voltage energy store 16, so that an average across all identified results can be made.

LIST OF REFERENCE CHARACTERS

10 Motor vehicle
12 Electrical wiring system

14 Electronic computing device
16 High-voltage energy store
18 Energy store-internal part
20 First insulation monitor
22 Ground
24 High-voltage positive path
26 High-voltage negative path
28 Second insulation monitor
30 Energy store-external part
32 Pre-charging device
34 First Y capacitance
36 Second Y capacitance
38 Current capacitance value
40 Switching device
42 First insulation resistance
44 Second insulation resistance
46 Storage device
48 Capacitance value

The invention claimed is:

1. A method for determining a current capacitance value (38) of a Y capacitance (34, 36) of an electrical wiring system (12) for an at least partially electrically operated motor vehicle (10) by an electronic computing device (14), wherein a high-voltage energy store (16) of the electrical wiring system (12) is electrically coupled with an energy store-external part (30) by a switching device (40) of the electrical wiring system (12), comprising the steps of:

in an energy store-internal part (18) of the electrical wiring system (12), determining a first insulation resistance (42) on a basis of a capacitance value (48) of the electrical wiring system (12) by a first insulation monitor (20);

determining a second insulation resistance (44) of the electrical wiring system (12) by a second insulation monitor (28) of the energy store-external part (30);

comparing the first insulation resistance (42) with the second insulation resistance (44) by the electronic computing device (14); and on a basis of the comparing, adjusting the capacitance value (48) for determining the first insulation resistance (42) by the first insulation monitor (20) such that the first insulation resistance (42) matches the second insulation resistance (44).

2. The method according to claim 1, wherein a starting capacitance value is predetermined as a saved capacitance value in a storage device (46) of the electronic computing device (14) for the capacitance value (48).

3. The method according to claim 2, wherein the starting capacitance value is predetermined when the motor vehicle (10) is being manufactured.

4. The method according to claim 1, wherein the first insulation resistance (42) is periodically compared with the second insulation resistance (44) and an adjustment of the capacitance value (48) is carried out and wherein the capacitance value (48) at which the first insulation resistance (42) comes closest to the second insulation resistance (44) is adopted as the current capacitance value (38).

5. The method according to claim 4, wherein to determine the current capacitance value (38), the adjusting of the capacitance value (48) is iterative.

6. The method according to claim 1, wherein the current capacitance value (38) is saved as a starting capacitance value for a future analysis in a storage device (46) of the electronic computing device (14).

7. The method according to claim 1, wherein after an adjustment of the current capacitance value (38) and saving it as a starting capacitance value, a further, renewed determining of the current capacitance value (38) is carried out and a newly determined value is compared with the saved starting capacitance value.

8. The method according to claim 1, wherein depending on the determined current capacitance value (38), a current first insulation resistance (42) of the electrical wiring system (12) is determined by first insulation monitor (20).

9. An electrical wiring system (12) for an at least partially electrically operated motor vehicle (10), comprising:

an electronic computing device (14);

an electrical high-voltage energy store (16);

a first insulation monitor (20); and a second insulation monitor (28);

wherein the electrical wiring system (12) is configured for performing the method according to claim 1.

* * * * *